Nov. 7, 1967    W. F. DATWYLER, JR., ET AL    3,351,080

FLUID DEVICE

Filed June 24, 1965    2 Sheets-Sheet 1

INVENTORS
WALTER F. DATWYLER JR.
ENDRE A. MAYER
BY LAEL B. TAPLIN

ATTORNEY

United States Patent Office 3,351,080
Patented Nov. 7, 1967

3,351,080
FLUID DEVICE
Walter F. Datwyler, Jr., Royal Oak, Endre A. Mayer, Birmingham, and Lael B. Taplin, Livonia, Mich., assignors to The Bendix Corporation, Southfield, Mich., a corporation of Delaware
Filed June 24, 1965, Ser. No. 468,186
16 Claims. (Cl. 137—81.5)

ABSTRACT OF THE DISCLOSURE

A fluid vortex amplifying device having a vortex chamber receiving a supply flow, a biasing flow, and a superimposed control flow to establish a rotational flow in the chamber, an outlet for egress of the rotational flow thereby creating a conical flow dispersion pattern downstream of the chamber outlet, a probe downstream of the chamber outlet positioned coaxially with the conical dispersion pattern to receive a portion of the outlet flow, a second chamber surrounding the probe to receive the balance of the outlet flow, and an output responsive to the proportions of the flow received by the probe and the second chamber.

---

This invention relates to a fluid device and more particularly to a fluid vortex device.

Fluid vortex devices are generally known in the art. They comprise a cylindrical chamber, an inlet for introducing supply fluid to the chamber, an axially disposed outlet for discharge of fluid from the chamber and a control port for introducing control fluid tangentially into the chamber to impart rotational velocity or vorticity to the fluid flowing through the chamber. When the control flow is zero, the supply fluid introduced into the chamber leaves through the outlet without any restriction. However, the introduction of the control fluid imparts a rotational velocity to the fluid in the chamber which produces a reduction in the amount of fluid emerging from the outlet. The amount of fluid emerging decreases as the rotational velocity is increased.

In accordance with this invention, a receiver is positioned at the output of the vortex device described above to provide a novel fluid vortex amplifier capable of very efficient recovery of the fluid supply pressure. A biasing fluid flow is introduced to the vortex chamber to impart a biasing rotational velocity to the supply fluid so as to operate the amplifier in its linear range. The amplifier normally operates in a proportional mode, that is, its output pressure is proportional to the magnitude of the input control signal. However, under certain conditions, it also operates in a digital mode, that is, the input control signal is converted into a pulsating pressure output having a frequency which is proportional to the magnitude of the input control signal. As will be hereinafter described, this device has many applications including application as a fluid pressure amplifier, a rate sensor, a valve, an analog to digital converter and a liquid level gauge.

Accordingly, it is an object of this invention to provide a novel fluid vortex amplifier having a receiver for efficiently recovering the fluid supply pressure.

It is another object of this invention to provide an amplifier of the above character which operates with a biasing rotational velocity applied thereto.

It is a further object of this invention to provide an amplifier of the above character which operates in a proportional mode to amplify its pressure output in accordance with the magnitude of an input control signal.

It is still another object of this invention to provide an amplifier of the above character which under certain conditions will operate in a digital mode to produce a pulsating output having a frequency indicative of the input control signal.

Other objects and advantages will become apparent from the following description and from the appended drawings and claims.

Figure 1:
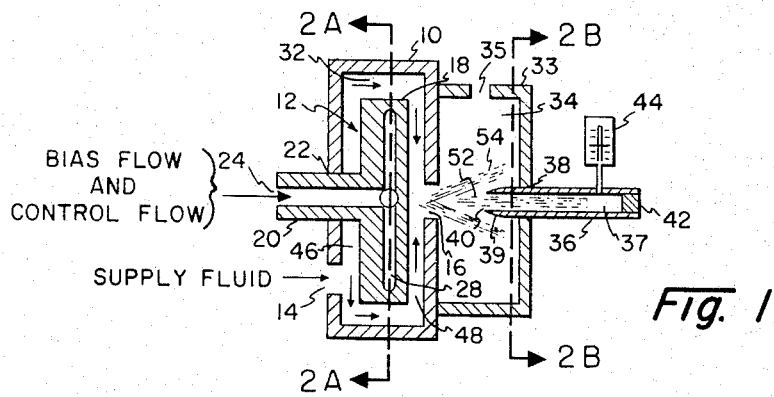
FIGURE 1 is a schematic representation of a side sectional view of an embodiment of this invention.
Figure 2A:
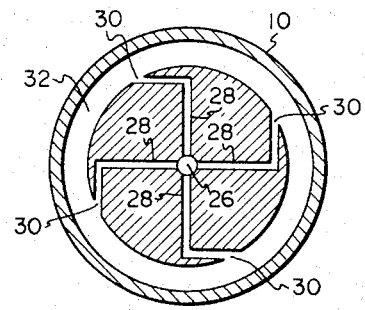
FIGURES 2A and 2B are front sectional views taken substantially along lines 2A—2A and 2B—2B of FIGURE 1.
Figure 2B:
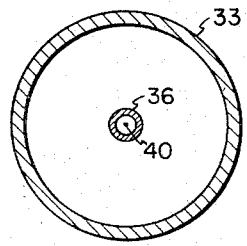

In FIGURE 1, a housing 10 defines a cylindrical chamber generally indicated at 12. An inlet opening 14 extends through the housing 10 for the introduction of supply fluid, such as air, under pressure into the chamber 12. Also extending through the housing 10, axially of the chamber 12, is an outlet opening 16 for exhausting the supply fluid from the chamber 12.

Disposed within the chamber 12 is a cylindrical member 18. A shaft 20 extends from the member 18 through an annular opening 22 through the housing 10 and supports the member 18 within the chamber 12. A line 24 extends through the shaft 20 and communicates with a central annular opening 26 in the member 18. A plurality of channels 28 extend from the opening 26 through the member 18. The outlets 30 of these channels communicate tangentially with the annular chamber 32 between the member 18 and the housing 10. Preferably, the outlets 30 are spaced at substantially equal intervals along the periphery of the member 18. Fluid flow introduced under pressure to the line 24 passes through the opening 26, the channels 28 and is introduced tangentially into the chamber 32 from the outlets 30. As described in copending application U.S. Serial No. 458,619 filed May 25, 1965 by Endre A. Mayer, rotational velocity is efficiently imparted to the supply fluid as it passes through the annular chamber 32.

Adjoining the housing 10 is another cylindrical housing 33 which defines a fluid chamber or cavity 34. An opening 35 in the housing 33 vents the cavity 34 to the atmosphere. Multiple vent openings may be provided in the housing 33 if desired to suit different applications. A receiver tube 36 defining a fluid line 37 extends through an annular opening 38 in the housing 33. The tube 36 is shaped at 39 to minimize any resistance to fluid flow and to reduce noise. The inlet 40 of the tube 36 is aligned axially with the outlet 16. A plug 42 blocks the other end of the tube 36 and a pressure gauge 44 communicates with the line 37 so as to indicate the pressure therein.

In the operation of the device described above, supply fluid introduced through the opening 14 enters the plenum chamber 46 between the member 18 and the housing 10. From the plenum chamber 46, the fluid passes through the annular chamber 32, the vortex chamber 48 and then emerges from the outlet 16. At a constant supply pressure, the amount of fluid flow $W_o$ from the opening 16 is at a maximum when the control flow introduced to the line 24 is zero. With zero control flow, no rotational velocity is imparted to the supply fluid as it passes through the annular chamber 32 and as a result the fluid flows radially through the vortex chamber 48 to the opening 16. This maximum flow is shown at point 50 in the graph of FIGURE 4 where the pressure of the control fluid flow $P_c$ is zero.

Figure 4:
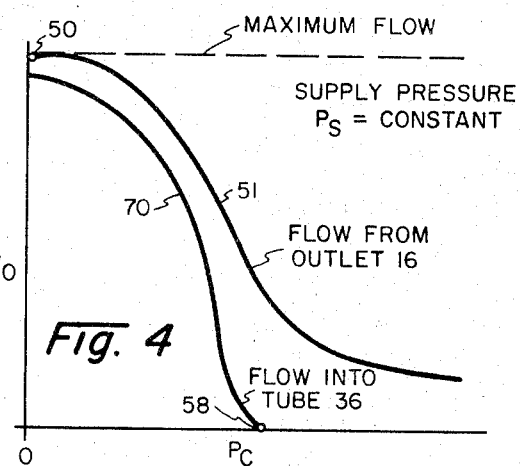
FIGURE 4 is a graph showing the fluid output of the device in FIGURE 1 under different conditions.

When a control flow is introduced to the line 24, this flow emerges from the outlets 30 of the channels 28 and imparts a rotational velocity to the supply fluid as it passes through the annular chamber 32. Because of the relatively small volume of the chamber 32 and because of the plurality of outlets 30 that communicate therewith, the rotational velocity is imparted to the supply fluid very efficiently. The supply fluid then entering the vortex chamber 48 has added to it a rotational velocity component in addition to its radial velocity component. This rotational velocity increases as the fluid approaches the outlet 16 and results in a restriction in the flow from the outlet. The amount of restriction in the flow increases with the increase in the control flow. The curve 51 in FIGURE 4 shows how the flow from the outlet 16 decreases as the control pressure $P_c$ increases.

With zero control flow, the supply fluid emerges from the outlet 16 in a substantially straight stream as shown at 52 in FIGURE 1 and is introduced directly into the inlet 40 of the tube 36. All of the fluid is introduced into the tube 36 and none of it is directed into the cavity 34. When this condition of nonvortex flow occurs, substantially 100% of the supply pressure is recovered in the tube 36, that is, the pressure in the tube $P_T$ is at a maximum when the pressure of the control fluid flow $P_c$ is zero. Point 53 in FIGURE 3 indicates this condition.

As a control flow is applied through the channel 24, the flow pattern of the fluid emerging from the outlet 16 adopts a conical pattern as shown at 54 in FIGURE 1. As $P_c$ increases the angle of the cone increases thus decreasing the amount of fluid entering the tube 36 and increasing the amount entering the cavity 34. Accordingly, the pressure in the tube 36 decreases as the pressure of the control flow increases. This is shown by the curve 55 in FIGURE 3.

At a sufficiently high control pressure the angle of the conical flow is large enough so that all the fluid emerging from the outlet 16 enters the cavity 34 and none enters the tube 36. This condition corresponds to point 58 on the curve 70 in FIGURE 4 showing the flow into the tube 36. Between zero pressure control condition and maximum pressure control condition the intermediate values would produce a proportionate change in the angle of conical flow from the outlet 16. As the control pressure increases from 0, the amount of fluid entering the tube 36 decreases and is diverted to the cavity 34. The angle of the conical flow increases in this way as the control pressure is increased until all the fluid is introduced into the cavity 34.

When the device in FIGURE 1 is operated as a pressure amplifier, it is operated with a bias pressure introduced to the passage 24 for imparting a biasing rotational velocity to the supply fluid in the annular chamber 32. This bias is shown at 62 in FIGURE 3. The application of a bias is important so as to operate the device in its linear range between points 62 and 64. The addition of an input control pressure to the bias will increase the conical angle of the fluid output at the outlet 16 and as a result the pressure $P_T$ in the tube 36 will proportionally decrease such as to the point 66 in FIGURE 3. Accordingly, the pressure $P_T$ decreases substantially linearly as the control fluid pressure $P_c$ is increased thus providing pressure amplification.

Although the operation of the amplifier in FIGURE 1 is described with tube 36 blocked off by the plug 42 and the cavity 34 being vented by the opening 35, it will also operate as an amplifier if the plug 42 is removed to vent the tube 36 and the opening 35 venting the cavity 34 is blocked instead. With this type operation, the pressure in the cavity 34 would be measured. This pressure would increase as $P_c$ is increased as shown by the curve 68 in FIGURE 3. The amplifier will also operate with partial venting of both the tube 36 and the cavity 34 in which case the differential pressure between the tube and the cavity could be measured.

The amplifier in FIGURE 1 may also be operated as a logarithmic amplifier with a suitable bias. For example, if the amplifier is biased to point 64 in FIGURE 3 it would operate on the lower portion of the curve which is substantially logarithmic. The device in FIGURE 1 can also be used as a valve for particular applications. For example, such a valve could be used to regulate the flow of fluid into a rocket nozzle or into a cylinder of a piston engine. With the plug 42 removed from the tube 36 and the vent 35 blocked, the amount of fluid passing through the tube 36 to a rocket nozzle would be controlled in accordance with the control pressure applied to the passage 24. The curve 70 in FIGURE 4 shows that at 58 the output of the tube 36 would be completely cut off.

Figure 5:
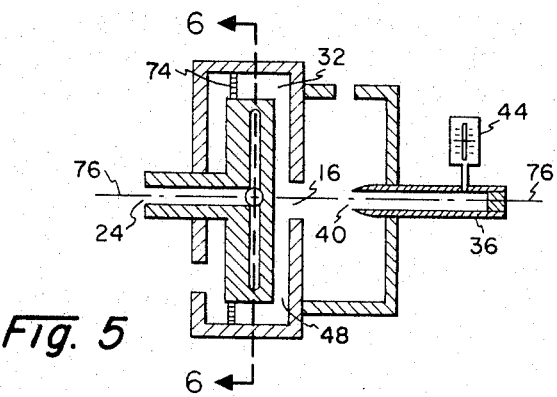
FIGURE 5 is a schematic representation of a side sectional view of another embodiment of this invention.
Figure 6:
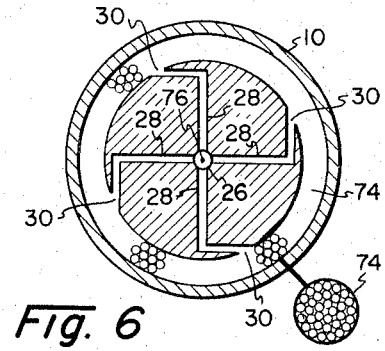
FIGURE 6 is a front sectional view taken substantially along line 6—6 in FIGURE 5.

Referring to FIGURES 5 and 6, the device shown is similar to the one in FIGURE 1 except that it includes in addition an annular inertial coupling element 74 positioned in the annular chamber 32 so that the device can be used as a rate sensor such as for sensing the rate of roll in aircraft. The element 74 can be made of any porous substance through which the fluid can flow. For example, it may be an annular parallel array of steel tubes, as shown partially in FIGURE 6, or it may be constructed of finely woven wire. The element 74 is suitably affixed between the housing 10 and the member 18 and is movable therewith.

When used as a rate sensor for roll, the device in FIGURE 5 is attached to the frame of the aircraft. Upon roll of the aircraft, the entire device in FIGURE 5, including the element 74, rotates as a unit about the axis 76 in the direction of the roll. The rotation of the element 74 imparts a rotational velocity to the fluid passing through it. The effect produced is the same as though an input control pressure were applied through the line 24, that is, the roll velocity of the aircraft or the number of degrees roll per second acts to change the pressure output of the tube 36 as shown by the curve 55 in FIGURE 3.

Figure 3:
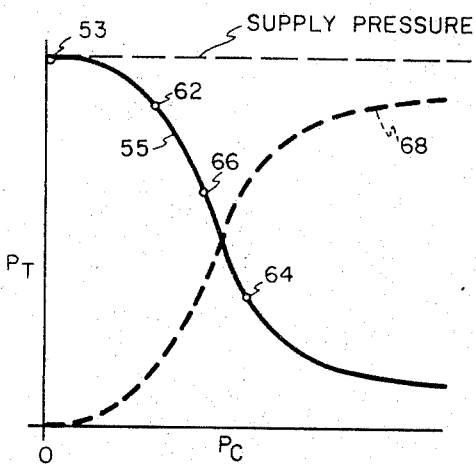
FIGURE 3 is a graph showing the pressure output of the device in FIGURE 1 under different conditions.

Since aircraft roll can occur in either a clockwise direction or in a counterclockwise direction, it would be necessary to provide a different bias than the one represented by point 62 in FIGURE 3. For example, the device may be biased to normally operate at the point 66 in FIGURE 3 so that aircraft roll occurring in either direction can be sensed. If the roll is in a direction to aid the bias, then $P_T$ would decrease and if it is in a direction to oppose the bias $P_T$ would increase. Accordingly, the gauge 44 may be scaled to provide an indication of the roll of the aircraft.

While operating a prototype model of this invention, it was found that under certain conditions the pressure output of the tube 36 was produced in pulsating form.

Figure 8:
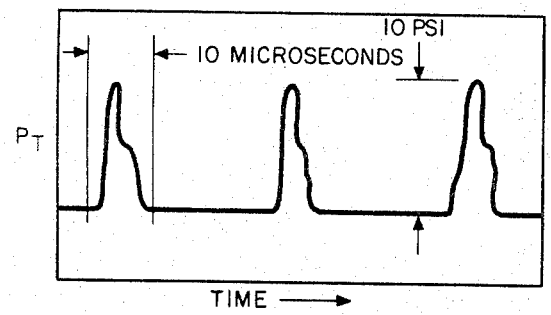
FIGURE 8 shows the waveform of the pulse output of the device in FIGURE 5 when operated in the digital mode.

FIGURE 8 illustrates the actual pulse outputs which were obtained in one case. The pulses occurred at substantially regular intervals. Pulse type operation or operation in the digital mode was achieved with the following conditions in two different prototypes:

|  | Prototype I | Prototype II |
|---|---|---|
| Diameter of outlet 16, inch | 0.060 | 0.050 |
| Diameter of inlet 40 of tube 36, inch | 0.040 | 0.030 |
| Distance between outlet 16 and inlet 10, inch | 0.120 | 0.080 |
| Supply fluid pressure, p.s.i.g | 30 | 1.0 |
| Bias pressure, p.s.i.g | 31 | 1.05 |
| Input control pressure, p.s.i.g | 30 to 35 | 1.0 to 1.5 |
| Diameter of housing 10, inches | 3.0 | 3.0 |
| Axial length of vortex chamber 48 between member 18 and housing 10, inch | 0.050 | 0.050 |

Figure 7:
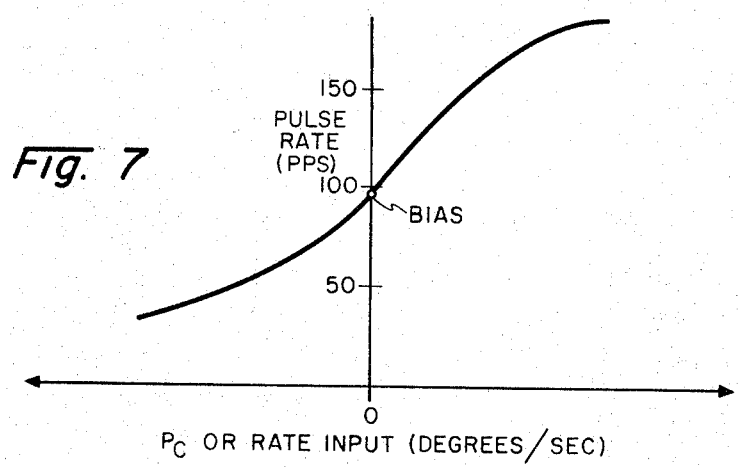
FIGURE 7 is a graph showing the frequency of the pulse output of the device in FIGURE 5 when operated in the digital mode.

It was found that the frequency of the pulse output changed in accordance with the control pressure $P_c$ applied thereto or the rate input in the event of operation of the device as a rate sensor. As shown in FIGURE 7, when the control pressure or rate input opposed the bias the frequency increased and when it aided the bias the frequency decreased. Therefore, in addition to operating this invention in a proportional mode as a pressure amplifier it was found that it can also be operated in a digital mode to indicate the pressure, that is, the frequency of the pulse output of the device provides an indication of the magnitude and direction of the input signal.

It will be understood by persons skilled in the art that this invention when operated in a digital mode can also be used as an analog to digital converter, that is, an analog input signal is converted into discrete pulses having a frequency corresponding to the magnitude of the input signal.

With reference to FIGURE 1, applicants believe that the following is an explanation of how their invention operates in a digital mode. At a particular constant supply pressure, the bias is established at a level such that the exit cone of the fluid from the outlet 16 is slightly smaller than the diameter of inlet 40 of the tube 36. The fluid stream entering the inlet 40 entrains a certain amount of the fluid which is trapped in the cavity 34 having a volume V. This entrainment reduces the pressure in the cavity. The reduction in pressure produces a differential pressure across the exit cone of the fluid. As this pressure is reduced to a low value, the exit cone of the fluid leaving the outlet 16 becomes wider. At some point the increasing cone becomes larger than the diameter of the inlet 40 and a large flow is directed into the cavity 34 causing the cavity pressure to rapidly rise. As the pressure in the cavity 34 returns to its initial level, the flow pattern returns to its original smaller exit cone and is again introduced entirely into the inlet 40. This cycle repeats itself to produce the pulse outputs at a paricular frequency.

Figure 9:
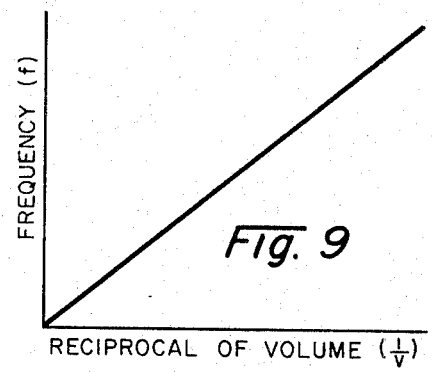
FIGURE 9 is a graph showing the relationship between the frequency of the pulse output of the device in FIGURE 5 and the reciprocal of the volume of a particular portion of the device when operated in the digital mode.

FIGURE 9 is a typical plot of the frequency of the pulse output as the function of the reciprocal of the volume of the cavity 34 indicating a nearly linear relation between the two. This data was taken at constant control and supply pressures. This relationship suggests that applicants' device may also be used as a liquid level detector. As the level of a liquid increases in the cavity 34, the volume of the cavity decreases and thus produces a proportionate change in the frequency of the output.

In the embodiment of FIGURE 1, the bias input and the control input were introduced through the channels 28 provided in the member 18. It will be recognized that such inputs into the annular chamber 32 may also be introduced through inlet ports provided in the outer housing 10. Further, any desired number of inlet ports in either or both the member 18 and the housing 10 may be provided for different applications. Also, the inlet ports may be disposed to introduce inputs in the same direction or one or more of them may be disposed to introduce inputs in a direction opposite to the inputs from the other ports.

Although air has been the fluid used in describing this invention, persons skilled in the art will recognize that the device described will operate with other fluids, gaseous or liquid, such as nitrogen, water or oil.

Although this invention has been disclosed and illustrated with reference to particular applications, the principles involved are susceptible of numerous other applications which will be apparent to persons skilled in the art. The invention is therefore to be limited only as indicated by the scope of the appended claims.

We claim:

1. A fluid device comprising
   a housing,
   means for introducing fluid into the housing,
   an outlet opening in the housing for exhausting supply fluid therefrom,
   means for introducing a biasing fluid flow into the housing for imparting a biasing rotational velocity to the supply fluid in the housing,
   means separate from said supply means for imparting a control rotational velocity to the supply fluid in the housing superimposed on said biasing rotational velocity and to produce at the outlet opening a conical fluid flow pattern rotating about an axis passing through said outlet opening having a dispersion angle in accordance with the control rotational velocity imparted,
   means defining a fluid line for measuring dispersion angle having an inlet opening positioned substantially coaxially with said outlet opening at a preselected distance downstream of said outlet opening in the housing,
   and means defining a fluid chamber encompassing the inlet opening of the fluid line for receiving any fluid from the outlet opening which is not received by the inlet opening of the fluid line,
   the amount of fluid received by the inlet opening of the fluid line and the pressure produced therein being dependent upon the dispersion angle of the conical flow pattern of the fluid emerging from the outlet opening and thus being in turn dependent upon control pressure.

2. A fluid device as recited in claim 1 wherein the fluid line is vented and the fluid chamber is not vented and wherein said device includes pressure responsive means connected to said fluid chamber for measuring fluid pressure therein.

3. A fluid device as recited in claim 1 wherein the fluid is vented and the fluid chamber is not vented and wherein said device includes pressure responsive means connected to said fluid chamber for measuring fluid pressure therein.

4. A fluid device as recited in claim 1 wherein the fluid line and the fluid chamber are both vented.

5. A fluid device as recited in claim 1 wherein the means defining the fluid line is a tube having an inlet opening at one end to receive the fluid emerging from the outlet opening of the housing.

6. A fluid device as recited in claim 1 wherein the means for imparting a control rotational velocity comprises means for introducing a control fluid flow tangentially into the housing.

7. A fluid rate sensor comprising
   a housing,
   means for introducing supply fluid into the housing,
   an outlet opening in the housing for exhausting supply fluid therefrom,
   means for introducing a biasing fluid flow into the housing for imparting a biasing rotational velocity to the supply fluid in the housing,
   an inertial coupling element disposed in the housing for the passage of supply fluid therethrough,
   the coupling element being movable with the housing to impart a control rotational velocity to the fluid superimposed on said biasing rotational velocity in accordance with the rate of movement of the housing and to produce at the outlet opening a conical fluid flow pattern rotating about an axis passing through said outlet opening having a dispersion angle in accordance with the control rotational velocity imparted, means defining a fluid line for measuring said dispersion angle having an inlet opening positioned substantially coaxially with said outlet opening at a preselected distance downstream of said outlet opening to receive fluid emerging from the outlet opening in the housing, and means defining a fluid chamber encompassing the inlet opening of the fluid line for receiving any fluid from the outlet opening which is not received by the inlet opening of the fluid line, the amount of fluid flow received by the inlet opening of the fluid line and the fluid pressure produced therein being dependent upon the dispersion angle of the conical flow pattern of the fluid emerging from the outlet opening, said fluid flow and fluid pressure being indicative of the rate of movement of the housing.

8. A fluid device comprising a housing, means for introducing supply fluid into the housing, an outlet opening in the housing for exhausting supply fluid therefrom, means defining a first fluid chamber having an inlet positioned at a particular distance from and substantially coaxially with the outlet opening in the housing to receive fluid emerging from the opening, means defining a second fluid chamber encompassing the inlet opening disposed to receive any fluid emerging from said outlet opening which does not enter the inlet of the first fluid chamber, means for introducing a biasing fluid flow into the housing for imparting a biasing rotational velocity to the supply fluid in a predetermined direction, means for introducing a nonreversing input control signal into the housing to impart a control rotational velocity to the supply fluid which is superimposed on said biasing rotational velocity to cause the fluid emerging from the outlet to alternately enter the inlet of the first fluid chamber and the second fluid chamber at a frequency dependent upon the magnitude of the control signal, and means for responding to said alternating flow of fluid.

9. A fluid device as recited in claim 8 wherein the means for introducing the input control signal comprises means for introducing a control fluid flow tangentially into the housing.

10. A fluid device as recited in claim 8 further including means to vary the volume of the second fluid chamber to produce a corresponding change in the output frequency of the device.

11. A fluid device as recited in claim 8 wherein the first fluid chamber is not vented and the second fluid chamber is vented.

12. A fluid device as recited in claim 8 wherein the first fluid chamber is vented and the second fluid chamber is not vented.

13. A fluid device as recited in claim 8 wherein the first and second fluid chambers are both vented.

14. A fluid device as recited in claim 8 wherein the means defining the first fluid chamber comprises a tube having an inlet opening at one end.

15. A fluid device as recited in claim 8 wherein the bias is of a magnitude to cause substantially all the fluid emerging from the outlet opening of the housing to enter the inlet of the first fluid chamber.

16. A fluid rate sensor comprising a housing, means for introducing supply fluid into the housing, an outlet opening in the housing for exhausting supply fluid therefrom, means defining a first fluid chamber having an inlet positioned at a particular distance from and substantially coaxially with the outlet opening in the housing to receive fluid emerging from the opening, means defining a second fluid chamber encompassing the inlet opening disposed to receive any fluid emerging from said outlet opening which does not enter the inlet of the first fluid chamber, means for introducing a biasing fluid flow into the housing for imparting a biasing rotational velocity to the supply fluid in a predetermined direction, an inertia coupling element disposed in the housing for the passage of supply fluid therethrough, and said element being movable with the housing to impart a control rotational velocity to the supply fluid in accordance with the rate of movement of the housing thereby causing the fluid emerging from the outlet to alternately enter the inlet of the first fluid chamber and the second fluid chamber at a frequency dependent upon the rate of movement and direction of movement of the housing.

References Cited

UNITED STATES PATENTS

| | | | |
|---|---|---|---|
| 3,198,214 | 8/1965 | Lorenz | 137—81.5 |
| 3,203,237 | 8/1965 | Ogren | 137—81.5 X |
| 3,216,439 | 11/1965 | Manion | 137—81.5 |
| 3,219,048 | 11/1965 | Palmisano | 137—81.5 |
| 3,256,899 | 6/1966 | Dexter et al. | 137—81.5 |
| 3,267,946 | 8/1966 | Adams et al. | 137—81.5 |
| 3,270,758 | 9/1966 | Bauer | 137—81.5 |
| 3,272,213 | 9/1966 | Jones | 137—81.5 |
| 3,272,215 | 9/1966 | Bjornsen et al. | 137—81.5 |
| 3,276,464 | 10/1966 | Metzger | 137—81.5 |
| 3,290,947 | 12/1966 | Reilly | 137—81.5 |

M. CARY NELSON, *Primary Examiner.*

S. SCOTT, *Assistant Examiner.*